(12) United States Patent
Bugnicourt et al.

(10) Patent No.: US 11,959,593 B2
(45) Date of Patent: Apr. 16, 2024

(54) METHOD FOR DETECTING A LEAK IN A SEALED AND THERMALLY INSULATING TANK

(71) Applicant: Gaztransport Et Technigaz, Saint Remy les Chevreuse (FR)

(72) Inventors: Bertrand Bugnicourt, Saint Remy les Chevreuse (FR); Laurent Spittael, Saint Remy les Chevreuse (FR); Nicolas Dupont, Saint Remy les Chevreuse (FR); Jean-Yves Le Stang, Saint Remy les Chevreuse (FR)

(73) Assignee: Gaztransport Et Technigaz, Saint Remy les Chevreuse (FR)

( * ) Notice: Subject to any disclaimer, the term of this patent is extended or adjusted under 35 U.S.C. 154(b) by 459 days.

(21) Appl. No.: 17/299,932

(22) PCT Filed: Dec. 16, 2019

(86) PCT No.: PCT/FR2019/053084
§ 371 (c)(1),
(2) Date: Jun. 4, 2021

(87) PCT Pub. No.: WO2020/128273
PCT Pub. Date: Jun. 25, 2020

(65) Prior Publication Data
US 2022/0049818 A1    Feb. 17, 2022

(30) Foreign Application Priority Data
Dec. 19, 2018   (FR) ........................................ 1873381

(51) Int. Cl.
*F17C 13/00*   (2006.01)
*G01M 3/02*   (2006.01)

(52) U.S. Cl.
CPC ............ *F17C 13/004* (2013.01); *G01M 3/02* (2013.01); *F17C 2201/0157* (2013.01);
(Continued)

(58) Field of Classification Search
None
See application file for complete search history.

(56) References Cited

U.S. PATENT DOCUMENTS 3,347,402 A * 10/1967 Forman ................. F17C 13/082
220/560.12
3,413,840 A   12/1968 Basile et al.
(Continued)

FOREIGN PATENT DOCUMENTS

CN   102478447 A   5/2012
CN   103196635 A   7/2013
(Continued)

OTHER PUBLICATIONS

Chinese Office Action dated May 20, 2022 issued in corresponding Chinese Patent Application No. 201980084776.7.
(Continued)

*Primary Examiner* — Kristina M Deherrera
*Assistant Examiner* — Mark A Shabman
(74) *Attorney, Agent, or Firm* — Blank Rome LLP

(57) ABSTRACT

The invention relates to a method for detection of a leak from a tank for liquid gas, said tank comprising a membrane surrounding the liquid gas, the membrane being surrounded by an insulation space which separates the membrane from a wall, the insulation space being filled an inert gas which is injected and extracted by at least one duct. The detection method comprises the following steps:

(Continued)

determining 921 a first variation of mass of inert gas ΔM1 between two moments by measuring the gas added and removed by the duct;

calculating 922 a second variation of mass of inert gas ΔM2 corresponding to a difference between two masses of inert gas measured in the insulation space; and comparing 931 the first variation with the second variation, and triggering an alarm if a difference E1 between the first variation and the second variation of mass of inert gas is greater than a first threshold S1.

22 Claims, 5 Drawing Sheets

(52) U.S. Cl.
CPC ............... *F17C 2203/0358* (2013.01); *F17C 2203/0379* (2013.01); *F17C 2203/0612* (2013.01); *F17C 2221/033* (2013.01); *F17C 2221/035* (2013.01); *F17C 2250/032* (2013.01); *F17C 2250/043* (2013.01); *F17C 2250/0439* (2013.01); *F17C 2250/0491* (2013.01); *F17C 2260/038* (2013.01); *F17C 2270/0107* (2013.01)

(56) References Cited

U.S. PATENT DOCUMENTS

| 3,489,311 | A | * | 1/1970 | Burgoa | F17C 13/126 |
| | | | | | 220/592.25 |
| 3,919,855 | A | * | 11/1975 | Turner | F17C 3/022 |
| | | | | | 220/560.12 |
| 4,404,843 | A | * | 9/1983 | Johnson | G01M 3/226 |
| | | | | | 73/40.7 |
| 2013/0174649 | A1 | | 7/2013 | Hains et al. | |
| 2017/0138536 | A1 | | 5/2017 | Bleomelen et al. | |

FOREIGN PATENT DOCUMENTS

| DE | 1648612 A1 | 4/1971 |
| EP | 1 939 606 A1 | 7/2008 |
| GB | 1 379 117 A | 1/1975 |
| JP | S5751097 A | 3/1982 |
| JP | 2017180748 A | 10/2017 |

OTHER PUBLICATIONS

First Examination Report dated May 30, 2022 issued in corresponding Indian Patent Application No. 202127024592.

\* cited by examiner

METHOD FOR DETECTING A LEAK IN A SEALED AND THERMALLY INSULATING TANK

CROSS-REFERENCE TO RELATED APPLICATIONS

This application is a U.S. national stage application based on International Application No. PCT/FR2019/053084 filed Dec. 16, 2019, which claims priority to French Application No. 1873381, filed Dec. 19, 2018, both of which are herein incorporated by reference in their entirety.

TECHNICAL FIELD

The invention relates to the field of sealed, thermally insulating tanks for storage of a liquid gas at low temperature, and more particularly to a method for detection of a leak from a sealed, thermally insulating tank for liquid gas. Tanks of this type can be used for storage or transport of different gases, for example methane, butane, ethylene, etc.

TECHNOLOGICAL BACKGROUND

Sealed, thermally insulating tanks with membranes are used in particular for storage of liquid natural gas (LNG), which is stored at atmospheric pressure at approximately −163° C. These tanks can be installed on a structure which is or is not floating (for example a tank on land or storage structure which is conventionally made of concrete, known as GBS), and are designed for the transport of liquid natural gas or to receive liquid natural gas which is used as fuel for propulsion of the structure which is or is not floating.

In the prior art, sealed, thermally insulating tanks are used for storage of liquid gas, and are incorporated in a support structure, such as the double hull of a ship which is designed for the transport of liquid natural gas. Generally, tanks of this type comprise a multi-layer structure, having in succession, in the direction of the thickness from the exterior to the interior of the tank, a secondary thermal insulation barrier which is retained on the support structure, a secondary sealing membrane which is supported against the secondary thermal insulation barrier, a primary thermal insulation barrier which is supported against the secondary sealing membrane, and a primary sealing membrane which is supported against the primary thermal insulation barrier, and is designed to be in contact with the liquid natural gas contained in the tank.

In order to detect leakages, according to U.S. Pat. No. 4,404,843 there is filling with an inert gas of the spaces containing the primary thermal insulation barrier and the secondary thermal insulation barrier. Depending on the confinement systems, the primary and secondary spaces are regulated to pressures which are different, but always greater than atmospheric pressure. In order to compensate for any changes in pressure caused by changes of temperature in the interior of the spaces, or to compensate for variations of atmospheric pressure, the pressure of each space is regulated and maintained in a constant relative pressure range by a regulation system which makes it possible to inject inert gas, or to discharge part of it to the atmosphere.

Application US2017/0138536 indicates that cryogenic tanks can have hot spots or cold spots, and thus that the system for detection of the flow of gas entering into and exiting from the insulation spaces may be defective, and trigger false alarms. In order to remedy the problem, this document proposes using different inert gases for the different insulation spaces. Leakage is detected by detection of a gas which should not be in the space concerned. This detection method makes it necessary to have a plurality of types of inert gas, and thus a plurality of distribution circuits, which is more complex to implement on a gas transport ship.

SUMMARY

An idea on which the invention is based consists of using only a single inert gas, while eliminating the problems of the prior art. For this purpose, temperature sensors are placed at multiple locations all around the tank containing liquid gas, in order to determine a thermal cartography of the insulation space which is situated around the tank and is filled with inert gas. By means of this thermal cartography, it is proposed to calculate precisely the mass of inert gas which is present in the insulation space at two given moments (method 2), and to compare the variation of gas thus calculated between these two moments with a quantity of gas measured on the entering and exiting flows of gas between these two moments (method 1). The law of conservation of the mass means that the variation of mass determined by both methods is the same. Any leakage of gas towards the exterior of the tank will result in an imbalance between these two results.

According to one embodiment, the invention provides a method for detection of a leak from a sealed, thermally insulating tank for liquid gas. Said tank comprises a sealing membrane surrounding the liquid gas, the sealing membrane being surrounded by an insulation space which separates the sealing membrane from a support wall, which itself is sealed, the insulation space being filled with solid, thermally insulating materials and an inert gas, the insulation space being provided with at least one injection duct and at least one extraction duct in order to inject and extract the inert gas. The detection method comprises the following steps:
  determining a first variation of mass of inert gas between a first moment and a second moment, the first variation corresponding to the resultant of the total masses of inert gas added by the injection duct and removed by the extraction duct, between the first moment and the second moment;
  determining a first mass of inert gas in the insulation space at the first moment and second mass of inert gas in the insulation space at the second moment by means of measurements of the pressure and temperature in a free volume of the insulation space;
  calculating a second variation of mass of inert gas between the first moment and the second moment, corresponding to the difference between the second mass and the first mass of inert gas; and
  comparing the first variation of mass of inert gas with the second variation of mass of inert gas, and triggering an alarm if a difference between the first variation and the second variation of mass of inert gas is greater than a first threshold.

The expression "inert gas" means the gas(es) present in the insulation space, i.e. conventionally a non-reactional neutral gas of the type such as dinitrogen ($N_2$), which is the gas initially present in the insulation spaces, and the gas which is injected during the service life of said insulation spaces. However, the method according to the invention still works when there is pollution of gas in these insulation spaces, typically by undesirable introduction of hydrocarbon(s), such as, for example, methane ($CH_4$) into these spaces, in particular on the occasion of a leakage from the (primary) sealing membrane. In this last hypothesis, the expression "inert gas" includes this or these undesirable gas(es) such as methane.

The method and system according to the invention can advantageously comprise one or a plurality of sensors which can analyze the nature of the gases which are present in the insulation spaces, or exit from said spaces, such as to refine the calculation of the masses according to the nature of these gases, i.e. dinitrogen ($N_2$), or for example methane ($CH_4$). These sensors are advantageously connected to the system for analysis of the gases which are conventionally present in a transporter (ship) or storage unit (on land or at sea) for liquid gas.

It will be appreciated that the term "ship" used in the present application in association with the present invention is not limited to a transporter making a journey between two ports or geographical areas, but that it can also involve a static boat such as a barge or an FSRU ("Floating Storage and Regasification Unit"), or also a storage and/or treatment structure located on land.

The present invention could also be expressed as follows.

The invention provides a method for detection of a leak from the insulation space of a sealed, thermally insulating tank for liquid gas. Said tank comprises a sealing membrane which surrounds the liquid gas, the sealing membrane being surrounded by an insulation space separating the sealing membrane from a support wall which itself is sealed, the insulation space being filled with solid (and optionally porous) thermally insulating materials and an inert gas, the insulation space being provided with at least one injection duct and at least one extraction duct in order to inject and extract the inert gas. The detection method comprises the following steps:

Method 1: determining a first variation of mass of inert gas between a first moment and a second moment, by integration on a time basis of the flows of injection and extraction, then differentiation of the integrated flows;

Method 2: determining a first mass of inert gas in the insulation space at the first moment $t_1$ and a second mass of inert gas in the insulation space at the second moment $t_2$ by means of measurements of the pressure and temperature in the free volume of the insulation space;

calculating a second variation of mass of inert gas between the first moment $t_1$ and the second moment $t_2$ corresponding to the difference between the second mass and the first mass of inert gas; and comparing the first variation of mass of inert gas with the second variation of mass of inert gas, and alerting the operator if the difference between the first variation and the second variation of mass of inert gas is greater than a first threshold.

Thanks to a method of this type, it is possible to detect a leak from an insulation space of a cryogenic tank. Thus, the invention can be used for tanks which are used to store liquid petroleum gas (LPG), constituted mostly by butane. The transport or storage in a cryogenic tank can be carried out at −44° C. at atmospheric pressure, and can require a tank with only a simple insulation space.

In the case of liquid natural gas (LNG), constituted mostly by methane, the storage temperature is −162° C., and requires a double insulation space. According to one embodiment, the subject of the method for detection of a leak can be used in a single insulation space, or in both.

For this purpose, according to a first embodiment, the sealing membrane is a secondary sealing membrane, the insulation space is a secondary insulation space, and the tank comprises a primary sealing membrane which is situated between the secondary sealing membrane and the liquid gas, the secondary sealing membrane and the primary sealing membrane being separated by a primary insulation space filled with solid (optionally porous) thermally insulating materials and inert gas.

For this purpose, according to a second embodiment, the sealing membrane is a primary sealing membrane, the insulation space is a primary insulation space, the difference is a primary difference, and the tank comprises a secondary sealing membrane which is situated between the primary sealing membrane and the exterior wall, the primary sealing membrane and the secondary sealing membrane being separated by the primary insulation space, the secondary sealing membrane and the support wall being separated by a secondary insulation space filled with solid (optionally porous) thermally insulating materials and inert gas.

According to a preferred mode of a double-membrane tank, the method for detection of a leak is carried out on both insulation spaces. Thus, the second embodiment is modified such that, with the secondary insulation space being provided with at least one injection duct and at least one extraction duct in order to inject and extract the inert gas, the detection method also comprises the following steps:

determining a third variation of mass of inert gas in the secondary insulation space between the first moment and the second moment, the third variation corresponding to the resultant of the total masses of inert gas added by the injection duct and removed by the extraction duct between the first moment and the second moment;

determining a third mass of inert gas in the secondary insulation space at the first moment, and a fourth mass of inert gas in the secondary insulation space at the second moment by means of measurements of the pressure and temperature in a free volume of the secondary insulation space;

calculating a fourth variation of mass of inert gas in the secondary insulation space between the first moment and the second moment corresponding to the difference between the fourth mass and the third mass of inert gas; and comparing the third variation of mass of inert gas with the fourth variation of mass of inert gas, and triggering an alarm if a secondary difference between the third variation and the fourth variation of mass of inert gas is greater than a second threshold.

According to a different presentation of this preferred mode of a double-membrane tank (with detection of a leak in both insulation spaces), this second embodiment is modified such that, with the secondary insulation space being provided with at least one injection duct and at least one extraction duct in order to inject and extract the inert gas, the detection process also comprises the following steps:

determining a third variation of mass of inert gas in the secondary insulation space between the first moment t1 and the second moment t2, by integration on a time basis of the flows of injection and extraction, then differentiation of the integrated flows, with the third variation corresponding to the resultant of the total masses of inert gas added by the injection duct and removed by the extraction duct between the first moment t1 and the second moment t2;

determining a third mass of inert gas in the secondary insulation space at the first moment t1 and a fourth mass of inert gas in the secondary insulation space at the second moment t2 by means of measurements of the pressure and temperature in a free volume of the secondary insulation space;

calculating a fourth variation of mass of inert gas in the secondary insulation space between the first moment t1 and the second moment t2 corresponding to the difference between the fourth mass and the third mass of inert gas; and comparing the third variation of mass of inert gas with the fourth variation of mass of inert gas, and alerting the operator if a secondary difference between the third variation and the fourth variation of mass of inert gas is greater than a second threshold.

By having measurements in two insulation spaces, it is possible to reduce the risk of false detection by studying any correlations between the differences. Thus, if the primary difference is greater than the first threshold and/or if the secondary difference is greater than the second threshold, and if the algebraic sum of the primary difference and the secondary difference is lower than the third threshold, it is possible to determine the presence of a leak in the secondary sealing membrane.

In addition, if the differences compensate for one another, this can mean that the leak is in the secondary sealing membrane. If the primary difference is greater than the first threshold and/or if the secondary difference is greater than the second threshold, and if the algebraic difference between the primary difference and the secondary difference is greater than a fourth threshold, it is possible to determine the presence of a leak in at least one of the primary and secondary insulation spaces. Conversely, if this difference between the primary difference and the secondary difference is low, this indicates a possible systematic error situation.

The thresholds which are used are determined according to cumulative measurement uncertainties on the calculation chain. In order to reduce the costs, the number of temperature sensors is reduced to a minimal number, while making it possible to map well the thermal image of all the insulation space volumes. However, the insulation spaces have relatively low thermal conductivity, which is associated with their primary function, i.e. insulating the tank thermally. However, during a change of exterior temperature or temperature in the interior of the tank, the thermal propagation takes place with slow kinetics, and this gives rise to an additional measurement risk associated with a transitory phase.

In order not to be affected by a possible transitory error, it is possible to reiterate the preceding steps between a third moment, corresponding to the first moment incremented by a confirmation time, and fourth moment corresponding to the second moment incremented by the confirmation time, and the presence of the leak is determined if said alarm is triggered again after the confirmation time has elapsed.

Taking into consideration the significant change of temperature during filling of the tank, the method is carried out after a time longer than a predetermined stabilization time after filling of the tank.

According to different embodiments, the measurements of the pressure and temperature can be carried out for a measurement time around, and for example after, the first moment, and around, and for example before, the second moment, with the first mass and the second mass being mean masses for the measurement time. The measurement time can be short enough for the inert gas which is added or extracted during the measurement time to be negligible in relation to the total mass of inert gas which is present in the insulation space. Preferably, no inert gas is added to, or extracted from, the insulation space during the measurement time. The measurement time can be shorter than the time which separates the first moment and the second moment. For example the first and second measurements are calculated in a sliding manner over the period of time.

According to one embodiment, the temperature measurements can comprise measurements carried out by means of temperature sensors placed in a plurality of locations on the support wall and on the secondary sealing membrane. Or, the temperature measurements can comprise estimates which are calculated on the basis of the temperature of the fluid contained in the tank, in its liquid or gaseous phase.

According to another embodiment, the first variation of mass of inert gas is measured according to a mass flow of inert gas at an injection valve of the injection duct and an extraction valve of the extraction duct.

The mass flow at the injection valve and/or the extraction valve can be determined in several ways, for example according to a degree of opening of the injection valve and/or of the extraction valve. The mass flow of the gas at the injection valve and/or the extraction valve can be determined according to the pressure and the temperature of the inert gas upstream and downstream from said valve. As a variant, the mass flow at the injection valve and/or the extraction valve can be measured by a flowmeter measuring the mass of gas at said valve.

In order to improve the precision, the measurements of the pressure and the temperature in order to determine the first or second mass of inert gas in the insulation space are carried out in a plurality of areas of the insulation space, with all of the areas forming the free volume of the insulation space.

According to another embodiment, the invention provides an installation for storage of liquid gas comprising a sealed, thermally insulating tank which comprises a sealing membrane surrounding the liquid gas, the sealing membrane being surrounded by an insulation space which separates the sealing membrane from a support wall which itself is sealed, the insulation space being filled with solid (and optionally porous) thermally insulating materials and an inert gas, the insulation space being provided with at least one injection duct and at least one extraction duct in order to inject and extract the inert gas. The tank comprises at least one pressure sensor and a plurality of temperature sensors which are configured to determine the pressure and the temperature of the inert gas enclosed in a free volume of the insulation space. The installation comprises flow measurement devices to measure a flow of inert gas in the injection duct and in the extraction duct, and at least one leak detection device. The at least one leak detection device is configured to:

determine together with the flow measurement devices a first variation of mass of inert gas between a first moment t1 and a second moment t2, with the first variation corresponding to the resultant of the total masses of inert gas added by the injection duct and removed by the extraction duct between the first moment and the second moment;

determining a first mass of the inert gas in the insulation space at the first moment t1 and a second mass of inert gas in the insulation space at the second moment t2 by means of pressure and temperature measurements carried out by the at least one pressure sensor and the plurality of temperature sensors in a free volume of the insulation space;

calculating a second variation of mass of inert gas between the first moment t1 and the second moment t2 corresponding to the difference between the second mass and the first mass of inert gas; and comparing the first variation of mass of inert gas with the second variation of mass of inert gas, and triggering an alarm (for example by alerting an operator) if a difference between the first variation and the second variation of mass of inert gas is greater than a first threshold.

For a double-membrane tank installation, the sealing membrane can be a secondary sealing membrane, the insulation space can be a secondary insulation space, and the tank can comprise a primary sealing membrane which is situated between the secondary sealing membrane and the liquid gas, the secondary sealing membrane and the primary sealing membrane being separated by a primary insulation space which is filled with solid (and optionally porous) thermally insulating materials and an inert gas.

According to a variant installation of a double-membrane tank, the sealing membrane can be a primary sealing membrane, the insulation space can be a primary insulation space, the difference can be a primary difference, and the tank can comprise a secondary sealing membrane which is situated between the primary sealing membrane and the support wall, the primary sealing membrane and the secondary sealing membrane being separated by the primary insulation space, the secondary sealing membrane and the support wall being separated by a secondary insulation space which is filled with solid (and optionally porous) thermally insulating materials and an inert gas.

According to different embodiments, the secondary insulation space is provided with at least one injection duct and at least one extraction duct in order to inject and extract the inert gas. The tank comprises at least one pressure sensor. Sensors of the plurality of temperature sensors are also configured to determine the temperature of the inert gas enclosed in the secondary insulation space. The installation comprises flow measurement devices in order to measure a flow of inert gas in the injection duct and in the extraction duct. The leak detection device is configured to implement the different of the method.

According to a preferred embodiment, the liquid gas storage installation is embarked on a liquid gas transport ship, the transport ship being able to comprise one or a plurality of liquid gas storage installations.

BRIEF DESCRIPTION OF THE FIGURES

The invention will be better understood, and other objectives, details, characteristics and advantages thereof will become more apparent from the following description of a plurality of particular embodiments of the invention, provided purely by way of non-limiting illustration, with reference to the appended drawings.

DESCRIPTION OF THE EMBODIMENTS

The invention will now be described by means of a main embodiment, around which different variants are mentioned or described. For this purpose, a single reference is used in all the figures and in the description, in order to describe the same element.

Figure 1:
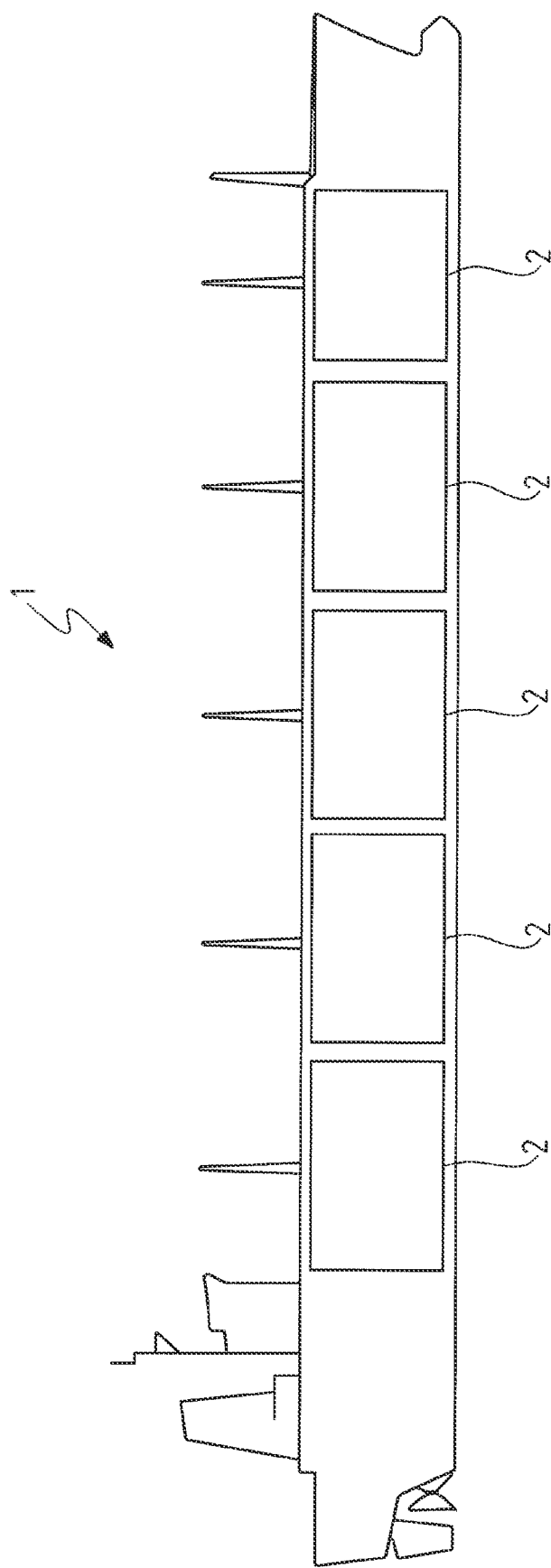
FIG. 1 represents an example of a ship incorporating tanks, and provided with a leak detection device.

FIG. 1 represents a methane tanker 1 with a plurality of tanks 2 which are designed to receive liquid gas at a pressure close to atmospheric pressure. Each of the tanks 2 is a sealed, thermally insulating tank in order to keep the fluid transported at its liquefaction temperature, which depends on the pressure of the gaseous atmosphere, i.e. for natural gas at a temperature of approximately −162° C. Tanks of this type can be produced by using different techniques, for example the technology marketed under the brand name Mark III® or the technology marketed under the brand name NO96® which both belong to the applicant.

Figure 2:
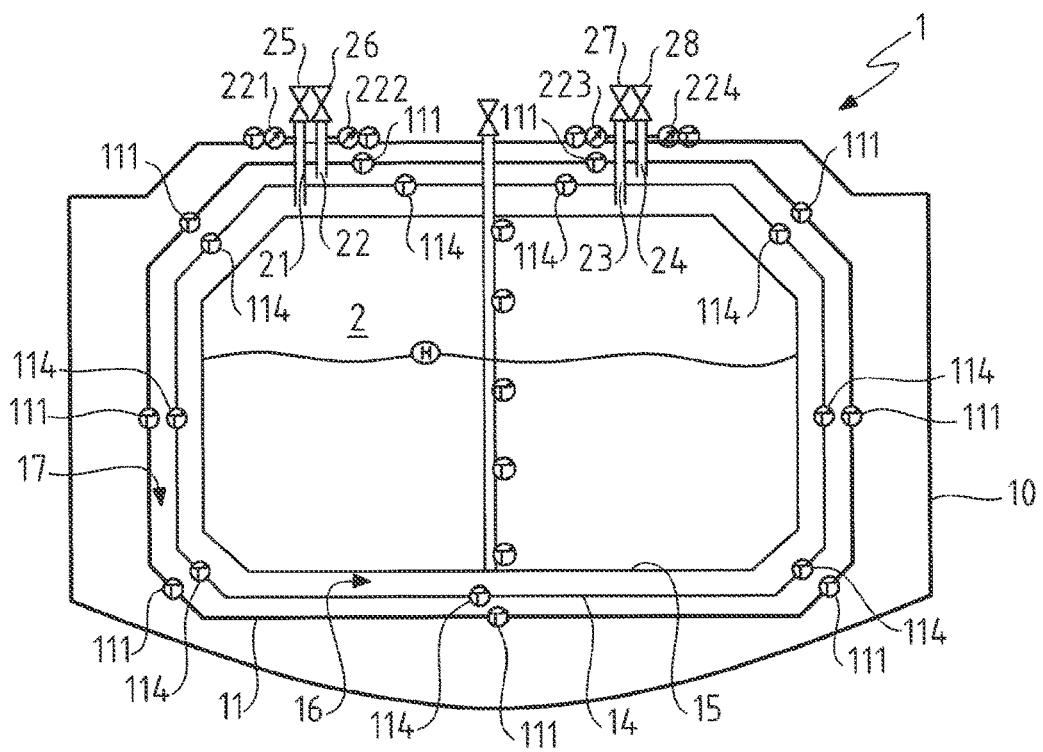
FIG. 2 represents schematically a tank of the ship in FIG. 1 in transverse cross-section.
Figure 3:
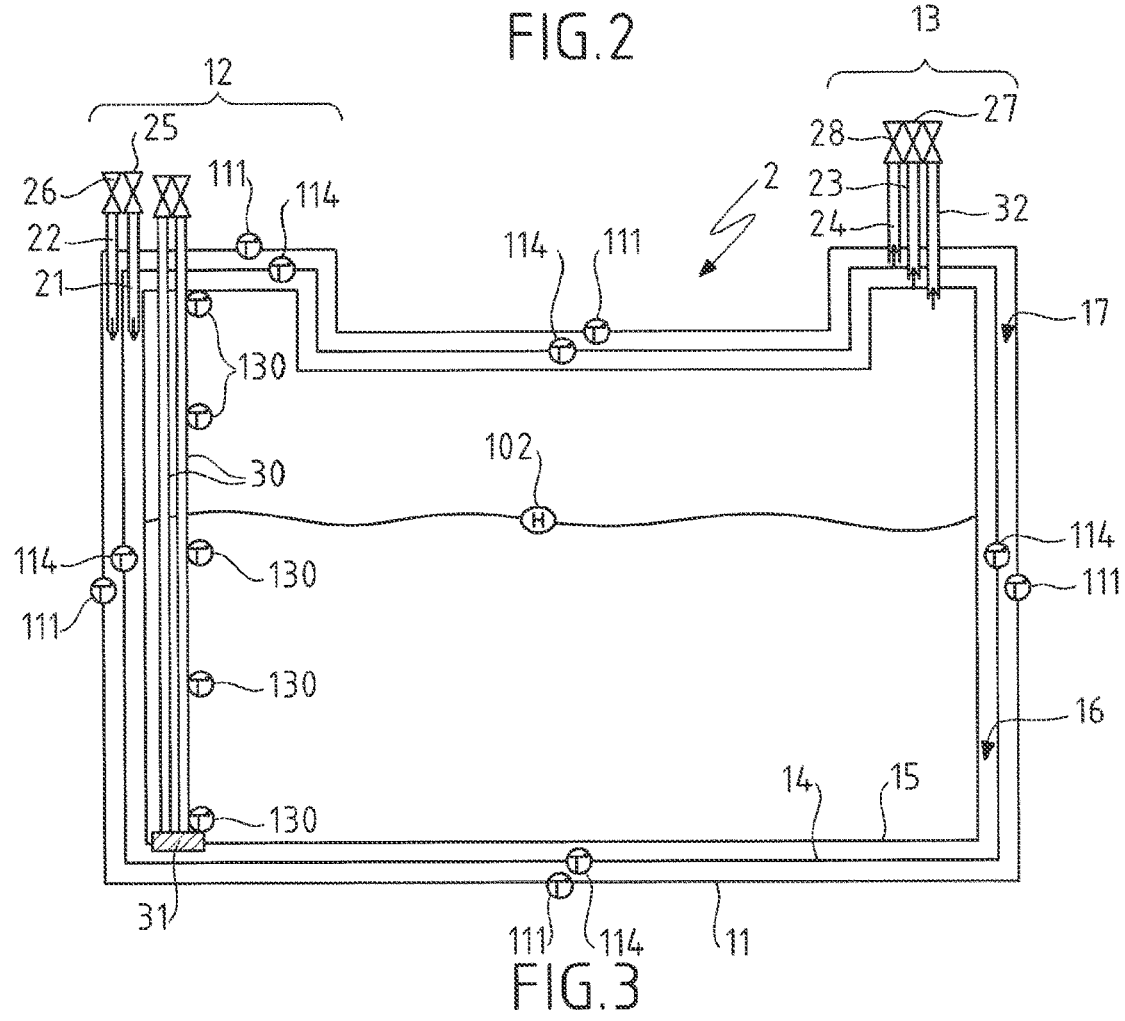
FIG. 3 represents schematically a tank of the ship in FIG. 1 in longitudinal cross-section.

One of the tanks 2 is described by means of FIGS. 2 and 3. FIG. 2 shows a transverse section of the ship 1, which comprises a double hull constituted by an outer wall 10 in contact with the sea and an inner wall 11 which acts as a support wall for a double-membrane tank 2. In this non-limiting embodiment represented in FIG. 2, the double hull encircles the tank 2, and has two projecting parts, commonly known as the liquid dome 12 and the gas dome 13, making it possible to ensure the exchanges of liquid and gaseous fluid between the tank and the loading or unloading terminal, and to inspect the tank, as well as to pass pipes through according to the known technique. The inner wall 11 must be sealed, including at the liquid and gas domes.

The inner wall 11 is covered with insulation blocks which are secured on this inner wall, firstly in order to ensure thermal insulation, and secondly to act as a support for a secondary sealing membrane 14. Other insulation blocks are placed on the secondary sealing membrane 14, in order firstly to ensure thermal insulation, and secondly to act as a support for a primary sealing membrane 15. The primary sealing membrane 15 is in contact with the liquid gas and the gaseous ceiling, and defines the useful volume of the tank. The secondary sealing membrane 14 acts as a safety device in the event of a leak from the primary sealing membrane. In addition, the space between the primary sealing membrane 15 and the secondary sealing membrane 14 constitutes a primary insulation space 16, and the space between the secondary sealing membrane and the inner wall 11 constitutes a secondary insulation space 17.

The tank 2 also comprises a metal structure 30 which supports the piping for control of the liquid gas, and at least one pump 31 to empty the liquid gas from the tank, as well as a pipe which makes it possible to fill the tank from the low part and/or the high part. The tank also comprises a vapor collector 32 for the gas which is situated in the tank, and results from the spontaneous vaporization of the liquid gas. The tank can comprise many other elements not represented, such as, for example, atomizers which are used to lower the temperature of the vapor phase.

Figure 4:
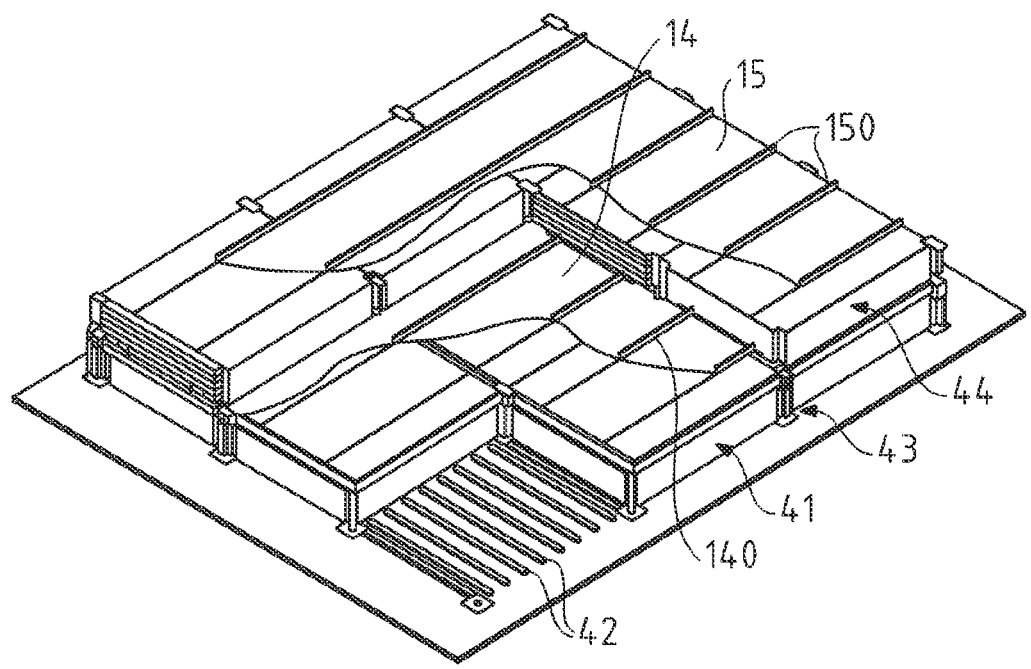
FIG. 4 illustrates an example of a wall of a sealed, thermally insulating tank for liquid gas.
Figure 5:
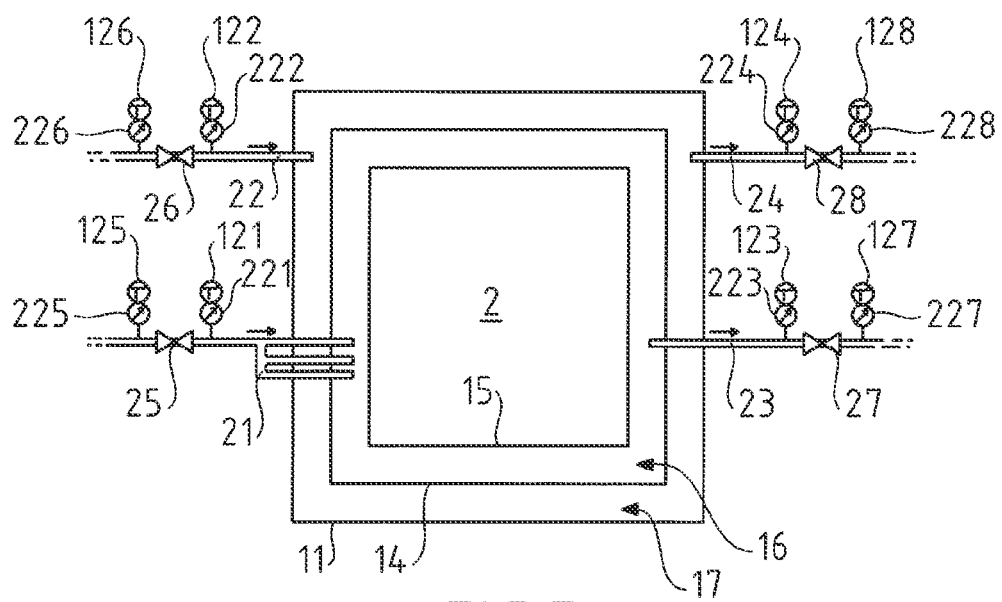
FIG. 5 illustrates a first embodiment of a gas flow calculation (method 1).

FIG. 4 shows an embodiment of a tank wall according to the NO96® brand name technology. Insulation blocks 41 are placed in the secondary insulation space 17 on resin strips 42 which can be polymerized and secured by anchorage devices 43. The resin strips 42 which can be polymerized serve the purpose of making up for the differences between the theoretical surface provided for the inner wall 11 and the imperfect surface resulting from the production tolerances, and to distribute the forces of the insulation blocks 41 on the inner wall 11 in a relatively homogenous manner. In certain systems, these strips made of resin which can be polymerized also ensure the retention of the insulation panel against the double shell. The anchorage devices 43 ensure the securing of the insulation blocks 41 on the inner wall 11. The secondary sealing membrane 14 is then deposited on the insulation blocks 41. In the example represented, the secondary sealing membrane 14 is made of Invar. It is deposited in long strips which are placed next to one another and welded to one another on raised edges. Insulation blocks 44 are then placed on the secondary sealed membrane 14 and secured through this secondary sealing membrane on the insulation blocks 41 of the secondary insulation space by the anchorage means 43. Then, the primary sealing membrane 15 is deposited and secured on the insulation blocks 44. By way of example, the primary sealing membrane 15 can also be made of Invar strips which are welded to one another by raised edges.

Very many variants make it possible to produce a double-membrane tank. The membranes 14 and 15 can be made of Triplex or of embossed stainless steel. The insulation blocks 41 and 44 can be identical or different. They are made of highly insulating material such as wood, polymer foam, glass wool and the like. A plurality of variants of anchorage systems are also known. In addition, in order to reduce the thermal conduction at the anchorage system 43, it is possible to fill the gaps between the insulating blocks with glass wool or another type of insulating material.

Although the primary 16 and secondary 17 insulation spaces are filled with insulating material, a certain free volume remains which permits the presence of a gas. For safety reasons, the air in the insulation spaces 16 and 17 is replaced by an inert gas, for example nitrogen. This passivation with nitrogen makes it possible to avoid the occurrence of a mixture, which is inflammable in the case of a leak of natural gas in the first insulation space and in the second insulation space. For this purpose, the primary 16 and secondary 17 insulation spaces are provided with injection ducts 21 and 22 and with ducts 23 and 24 for extraction of inert gas. The injection ducts 21 and 22 are for example placed at the level of the liquid dome, and are connected to a nitrogen reserve under pressure by means of injection valves 25 and 26. The extraction ducts 23 and 24 are for example placed at the level of the gas dome, and are connected to the atmosphere or to a device which makes it possible to burn the gases discharged by the extraction valves 27 and 28.

With the insulation spaces filled with nitrogen, they also participate in the detection of leaks. Slight pressurization of the nitrogen is carried out in the primary 16 and secondary 17 spaces relative to atmospheric pressure. A pressure difference can also exist between the primary insulation space 16 and the secondary insulation space 17. The differences of pressurization between the insulation spaces are a few tens of millibars, and are established for various reasons, such as the direction of the leaks and/or preloading of the membranes. Pressure regulation is carried out on these two insulation spaces 16 and 17 in order to maintain the pressure of each space in the pressure range which has been allocated to it.

When the inner wall 11 of the hull, the primary sealing membrane 15 or the secondary sealing membrane 14 are ruptured, then a leak is possible. Depending on the type of leak, different cases may arise. Inert gas can be displaced from one space to the other or to the exterior or to the tank. Liquid natural gas or water can also infiltrate into one of the primary 16 or secondary 17 insulation spaces. As a result of their composition, the double-membrane tanks have the advantage that a simple leak is not dangerous. In fact, the leak which it is wished to avoid at all costs is a leak of natural gas to the hull. In the event of rupture of the primary sealing membrane, the secondary sealing membrane acts as a safety device. In order to guarantee this safety, it is essential to guarantee the intactness of the secondary sealing membrane and of the inner wall 11, and consequently to ensure periodically or continually that it is sealed, and therefore intact.

In order to verify the intactness, it is proposed to carry out detection of a leak in the primary 16 and secondary spaces 17 by verifying that the quantity of inert gas present in each of the spaces 16 and 17 corresponds to the quantity of inert gas which has actually been put into each space.

Measurement of Variation of Mass by Means of the Flow (Method 1)

By means of measurement of the quantity of inert gas injected into, and extracted from, an insulation space, it is possible to determine the quantity added and removed between two moments. A first measurement of variation is carried out in order to obtain the variation of the quantity of inert gas added into, and/or removed from, the insulation spaces 16 and 17 between two moments t1 and t2.

This first measurement of variation can be carried out in different ways. According to a first embodiment, it is sufficient to determine the pressure difference by means of pressure sensors 221, 222, 223 224, 225, 226, 227 and 228 placed on the injection 21, 22 and extraction 23, 24 ducts, whilst knowing the percentage/level of opening of the injection 25, 26 and extraction 27 and 28 valves. A variant can consist of analytical determination of the different pressures upstream and downstream from the valves, instead of, and in the place of, the aforementioned pressure sensors 221, 222, 223 224, 225, 226, 227 and 228.

As a complement to the temperature sensors 121 to 128 placed upstream and downstream from each of the injection 25, 26 and extraction 27, 28 valves, on the basis of an equation known to persons skilled in the art (according to the upstream/downstream pressure, valve characteristic or "VC", and the density of the gas at the upstream temperature), this information makes it possible to determine the mass flow of the valves according to their level of opening.

The time which is spent with a given level of opening makes it possible to determine the quantity added into, or extracted from, each insulation space. The sum of the gas added less the sum of the gas extracted between two moments t1 and t2 makes it possible to determine for each insulation space the variation of the mass of gas between these two spaces, according to the levels of opening, and thus according to the mass flow of the valves 25 to 28, the main role of which is to maintain the pressure of the insulation space automatically in the range of operational pressures. If the valves 25 to 28 are manipulated manually, it may be preferable to use another method for measurement of flows.

Figure 6:
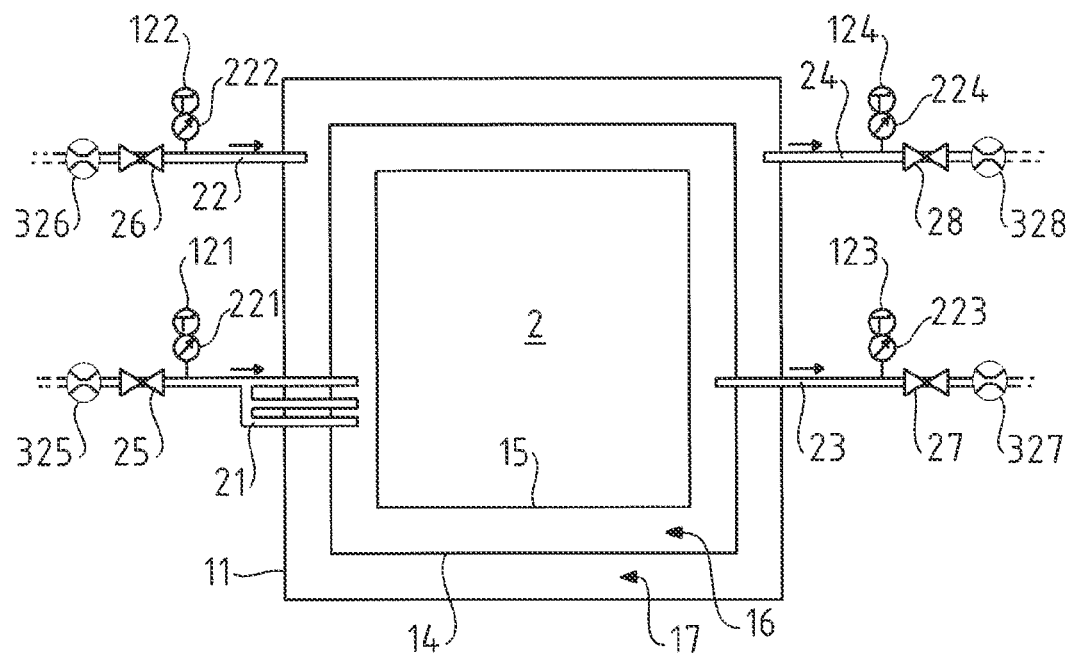
FIG. 6 illustrates a second embodiment of a gas flow calculation (method 1).

According to a second example, illustrated by means of FIG. 6, flowmeters 325 to 328 are placed on the injection 21, 22 and extraction 23, 24 ducts, for example upstream from the injection valves 25, 26, and downstream from the extraction valves 27, 28. The flowmeters 325 to 328 make it possible to measure or calculate the quantity of gas injected into, or extracted from, each insulation space 16 or 17. The sum of the gas injected less the sum of the gas extracted between the two moments t1 and t2 makes it possible to determine precisely for each insulation space the variation of the quantity of gas between these two moments t1 and t2.

The calculation of the quantity of gas injected into, or extracted from, each insulation space can be derived from combined application of the first and the second example, in other words by combining the use of pressure sensors 221, 222, 223 224, 225, 226, 227 and/or 228 placed on the injection 21, 22 or extraction 23, 24 ducts, whilst knowing the percentage/level of opening of the injection 25, 26 or extraction 27, 28 valves and one or a plurality from amongst the flowmeters 325 to 328 placed on the injection 21, 22 or extraction 23, 24 ducts.

If the two aforementioned embodiments of method 1 are expressed differently, i.e. more schematically, the presentation given below can be considered.

For the first example described above, it is necessary to have at least:
- a pressure sensor upstream from the input valve for each of the primary 16 and secondary 17 insulation spaces (on the understanding that there is already conventionally a pressure sensor downstream from the input valve of the primary 16 and secondary 17 spaces); and
- a pressure sensor downstream from the output valve for each of the primary 16 and secondary 17 insulation spaces (in the knowledge that there is already a pressure sensor upstream from the primary 16 and secondary 17 input/output valves); and
- a temperature sensor upstream from the input valve for each of the primary 16 and secondary 17 insulation spaces; and
- a temperature sensor upstream from the output valve for each of the primary 16 and secondary 17 insulation spaces.

The temperature sensors and the pairs of pressure sensors positioned on both sides of a valve make it possible to measure/calculate the input and output flows respectively of each of the primary 16 and secondary 17 insulation spaces.

For the second example described above, it is necessary to have at least:
- a flowmeter installed upstream (or downstream) from the input valve for each of the primary 16 and secondary 17 insulation spaces; and
- a flowmeter installed upstream (or downstream) from the output valve for each of the primary 16 and secondary 17 insulation spaces.

The flowmeters on both sides of the tank make it possible to measure the input and output flows respectively of each of the primary 16 and secondary 17 insulation spaces.

Measurement of Variation of Mass by Means of the Evaluation of Mass (Method 2)

In order to verify this first measurement of variation, it is necessary to measure the exact quantity of inert gas which is actually present in the insulation spaces 16 and 17 at the same two moments (t1 and t2). The measurement of the quantity of inert gas which is actually present in each insulation space 16 and 17 is carried out taking into account the volume, temperature and pressure of the inert gas. However, in view of the size of the tanks, and the nature of the insulation spaces 16 and 17, it must be taken into account that the temperature and pressure are not homogenous in the interior of the insulation spaces.

Ideally, in order to determine the exact quantity of inert gas, it would be necessary to determine the temperature and pressure which are applied to each elementary volume of the insulation space 16 or 17, in order to deduce therefrom the quantity of gas contained. Then, the summation of the quantity of gas contained in each elementary space would make it possible to determine the total quantity of gas contained in the insulation space 16 or 17.

In practice it is possible to divide each insulation space into a plurality of volumes, the temperature and pressure of which it is possible to determine or estimate relatively precisely with a limited number of sensors. It will be appreciated that, the larger the number of sensors, the more precise the estimation will be.

In order to determine the number of sensors, in the example described above, account has been taken of the fact that the primary and secondary membranes 14 and 15, as well as the inner wall 11, in view of their small thicknesses and high levels of thermal conductivity, are at a uniform temperature irrespective of which side is the location concerned. Also, between two temperature measurement points which are separated by a homogenous environment, a linear gradient of the temperature is taken into consideration between these two measurement points.

Temperatures sensors 111 are placed at different locations on the outer wall 11. Typically, at least one temperature sensor 111 is placed on each face constituting the inner wall 11. Temperature sensors 114 are placed at different locations on the same secondary sealing membrane 14. Typically, at least one temperature sensor 114 is placed on each face constituting the secondary sealing membrane 14. The temperature at the primary sealing membrane is determined by the temperature in the interior of the tank 2. Some temperature sensors 130 are secured for example on the structure for retention of the lines for filling and discharge of the fluid 30, and make it possible to measure the temperature of the fluid in its liquid and vapor phases. A separate installation also makes it possible to determine continually the level of filling of the tank (height position of the interface which separates the liquid phase from the gaseous phase of the fluid 102).

The temperature at any point of the inner wall 11 can be determined by applying a formula for calculation of the weighted mean according to the temperature sensors 111 which are situated in the vicinity of the point. Preferably, a larger number of temperature sensors is placed at the locations which are susceptible to strong variations of temperatures. Typically, the upper face of the inner wall 11, which can be produced in the form of an intermediate deck of the ship, comprises a number of temperature sensors 111 which is greater than the other faces. In fact, the liquid 12 and gas 13 domes are on the upper part of the tank 2, they support the retention structure 30 and the cross-members of the injection 21, 22 and extraction 23, 24 ducts and the steam collector 32, which are at temperatures associated with the gases transported, and thus rather cold, whilst also being under the heat of the sun, and therefore at a temperature which is rather higher than in other locations.

The temperature at any point of the secondary sealing membrane 14 is also determined by calculation of the weighted mean according to the temperature sensors 114 which are situated in the vicinity of the point. The number of sensors 114 also depends on the presumed homogeneousness of the temperature on the face concerned.

The secondary insulation space 17 is filled with solid (optionally porous) insulating materials between the secondary sealing membrane 14 and the inner wall 11. In a homogenous solid material, after a certain establishment time, a situation of equilibrium is reached in which the temperature gradient is linear between two points of the material. The temperature at a point of the secondary insulation space 17 depends on the location of this point relative to the inner wall 11 and to the secondary sealing membrane 14. The temperature can be calculated by a simple weighted mean between the points which are closest to the inner wall 11 and the secondary sealing membrane 14.

The temperature at the primary sealing membrane 15 is determined by the temperature of the fluid in its liquid and vapor phases. The fluid is maintained in the tank at the temperature of equilibrium between its liquid phase and its vapor phase (depending on the internal pressure of the tank). Experimental measurements have shown that the temperature of the gas in a vapor phase is stratified in increasing temperature layers according to the distance from the surface of the liquid gas.

Figure 7:
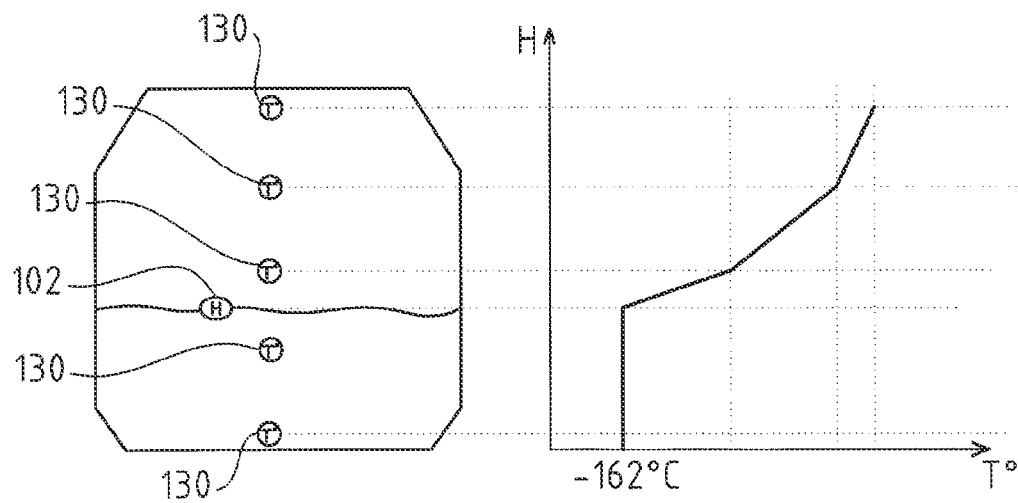
FIG. 7 illustrates a mode for calculation of the temperature at a primary sealed membrane by means of a reduced number of temperature sensors.

From the bottom of the tank 2 to the top of the tank, the temperature of the primary sealing membrane 15 is the temperature of the cargo at the same height. For the heights of tank corresponding to the positions of the temperature sensors 130, the temperature corresponds to the temperature measured by the temperature sensors 130. For the other heights, linear interpolation between the temperatures is carried out between the known temperatures. FIG. 7 illustrates an approximation of this type of the temperature inside the tank 2, produced by means of the temperature sensors 130 and the level sensor 102. This approximation gives the temperature of the primary sealing membrane 15 according to the height of the measurement point.

The primary insulation space 16 is filled with solid (and optionally porous) insulating materials between the secondary sealing membrane 14 and the primary sealing membrane 15. The temperature at a point of the primary insulation space 16 depends on the location of this point relative to the primary sealing membrane 15 and to the secondary sealing membrane 14.

The pressure sensors 221, 222, 223 and 224 placed on the injection 21, 22 and extraction 23, 24 ducts make it possible to measure the pressure at the top of the primary 16 and secondary 17 insulation spaces. The pressure thus measured can be considered as the pressure of the gas at any point of the insulation spaces 16 and 17. In one example, the pressure can be corrected according to the height of the gas in the interior of the insulation spaces 16 and 17.

The insulation spaces 16 and 17 have sizes and forms which are known by the tank manufacturer. Also, the solid materials which fill these spaces are known, as are their porosities and the free spaces which do not contain solid materials. On the basis of this knowledge, for any elementary space of each insulation space 16 or 17, it is possible to determine the free volume which can be filled with gas. The elementary mass of this elementary volume can be estimated for example by means of the following formula, derived from the law of perfect gases:

$$\text{Elementary mass} = M_N \times \frac{P}{R \cdot T} \times \varphi \times dV \qquad \text{[Math. 1]}$$

In this case, the density ρ of the inert gas can be determined by:

$$\rho = P \cdot M_N / R \cdot T \qquad \text{[Math. 2]}$$

For which MN is the molar mass of the nitrogen (in this case, in this example, the hypothesis of the presence of undesirable gas is not taken into consideration), P is the nitrogen pressure of the elementary space, R is the universal constant of perfect gases, T is the temperature of the elementary space, φ is the mean porosity of the environment of the elementary space, and dV is the volume of the elementary space.

The summation of all the elementary masses makes it possible to determine the total mass of inert gas present in each of the insulation spaces 16 and 17.

It is also possible to carry out determination of the mass of gas by using a division of each of the insulation spaces into a plurality of volumes having particular characteristics which make it possible to simplify the calculation. This amounts to characterizing the free spaces which allow the inert gas to circulate in each of the insulation spaces 16 and 17. If the insulation blocks 41 and 44 are made of closed-cell foam, the porosity is approximately 1%. By way of example, the gaps between the insulation blocks which are filled with glass wool have a porosity of approximately 85%. In addition, in the vicinity of the membranes, there are free spaces corresponding to the welded joints produced perpendicularly to the plane of the membrane and/or to the expansion joints of said membranes when they are made of stainless steel. The free volumes thus defined are known and can be modelled independently from one another.

In view of the small dimension of the free spaces in the vicinity of the membranes, all of the inert gas in these free spaces is at the same temperature as the membrane, which makes it possible to determine the mass of gas according to the mean temperature of the membrane, because the volume concerned is known. The temperature field in an insulation space can be approximated by a law according to which the temperature is distributed linearly in the direction of the thickness of the insulation space. It is possible to determine the mass of gas contained in the free spaces by taking into account the porosity of the environment. The sum of the masses of gas contained in the free spaces of an insulation space 16 or 17 gives the total mass of gas contained in said insulation space.

According to a variant which is even further simplified, there is determination of the free volume of inert gas located in each of the free half-spaces situated between half of each insulation space 16 or 17 and the membrane 14 or 15 or the inner wall 11. Then, the mean temperature of the membranes 14 or 15 or of the inner wall 11 is applied to the free half-space in the vicinity in order to obtain the corresponding mass of gas, which is then added to the other mass of gas of the insulation space concerned, in order to obtain the mass of gas in each space.

Irrespective of the mass calculation method used, a mass measurement must be carried out at the moment t1 and a mass measurement must be carried out at the moment t2 in order to be able to deduce a second variation measurement therefrom. The second variation measurement also corresponds to a quantity of inert gas added into and/or removed from the insulation spaces 16 and 17, which can be compared to the first variation measurement.

For reasons of precision of the mass calculation, the measurements of the level of liquid gas, pressure and temperature, can be averaged over measurement periods. In fact, a transitory variation in one of these measurements can falsify the mass calculation, whereas it is sufficient to take a mean value over a small measurement period in order not to be affected by a transitory variation. By way of example, the liquid gas has a free liquid surface on which waves form. The level measurement device 102 may be affected by this. Also by way of example, when nitrogen is injected into, or extracted from, one of the insulation spaces, this makes the temperature at the valve drop locally and temporarily, and can create an erroneous measurement if the measurement is carried out immediately before or after or during an operation of this type. Similarly, the large size of the tank means that the actual circulation of the gas in the insulation spaces is not instantaneous. The pressure equilibrium after the addition or extraction of nitrogen is not immediate, but can take a few tens of seconds.

Thus, it is possible to provide a measurement period of, for example, approximately 5 to 15 mn, in order not to be affected by measurement errors. Measurement periods can be placed around the first and second moments t1 and t2. For example, one of the periods starts after the first moment t1, and the other one of the periods ends before the second moment t2, with the second moment t2 taking place after the first moment t1. Preferably, the difference between the measurement moments t1 and t2 is far greater than the measurement period.

In order to obtain the most accurate measurement, it is preferable not to add or extract inert gas during the measurement periods. However, this is possible only if any action is prohibited during a measurement period, which is not necessarily possible. Another possibility is to carry out the measurements continually, and to create mean measurements in a sliding manner over a period of time. A criterion which can be used to select a measurement period from amongst the sliding means consists of not adding or extracting gas during a sliding period, or for the addition or extraction of gas during a sliding period to be slight enough to be negligible.

Detection of a Leak

Figure 8:
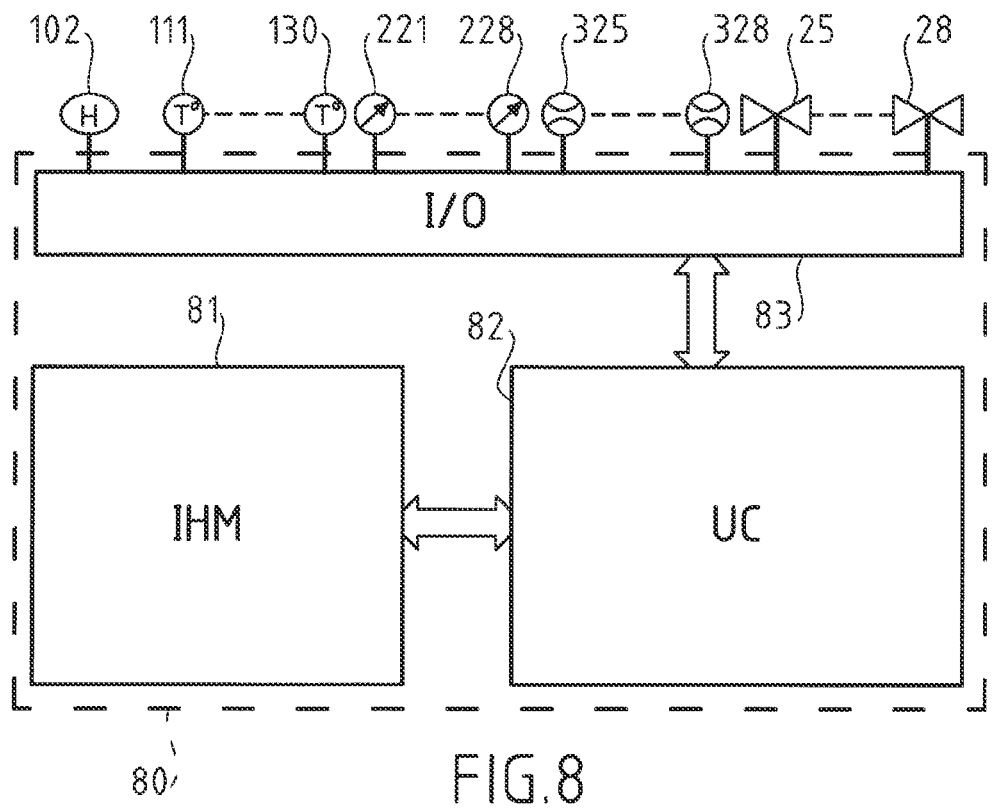
FIG. 8 is a functional diagram of a leak detection device.

Having explained the different measurement principles, a description must now be provided of how a leak is detected. FIG. 8 represents a functional diagram of a leak detection device 80, which comprises mainly a man-machine interface 81, a calculation unit 82, and an input/output interface circuit 83. The man-machine interface 81 is used to display the results of the measurements and leak alarms, and also to permit interaction with the system if applicable. The calculation unit 82 comprises a microprocessor and memory in order to implement programs and to store information temporarily as well as permanently. The input/output interface circuit 83 is a circuit which is connected to all the sensors placed on the tank 2, and in particular the level sensor 102, some or all of the temperature sensors 111 to 130, some or all of the pressure sensors 221 to 228, optionally the flowmeters 325 to 328, and the injection 25, 26 and extraction 27, 28 valve control inputs.

According to a particular embodiment, the leak detection device 80 is a standard computer located in the control room of the ship 1, and the input/output interface 83 is a standard communication interface board which makes it possible to communicate with the sensors and to control the valves. A communication board of this type can for example be compatible with a standard USB, if all the sensors are also, or it can be a radio communication board of the Wi-Fi or Zigbee type, if the sensors are provided with a communication interface of this type.

Amongst the programs which are implemented by the calculation unit 82, a first program relates to implementation of the measurements. Depending on the option selected for the calculation, this first program is either triggered each time a measurement is to be carried out, or it runs continually, and stores regularly measurements made, which will be used subsequently. The important thing is for the measurement program to make it possible to carry out measurements according to one of the methods previously described, and to permit implementation of a second leak detection program described hereinafter.

Figure 9:
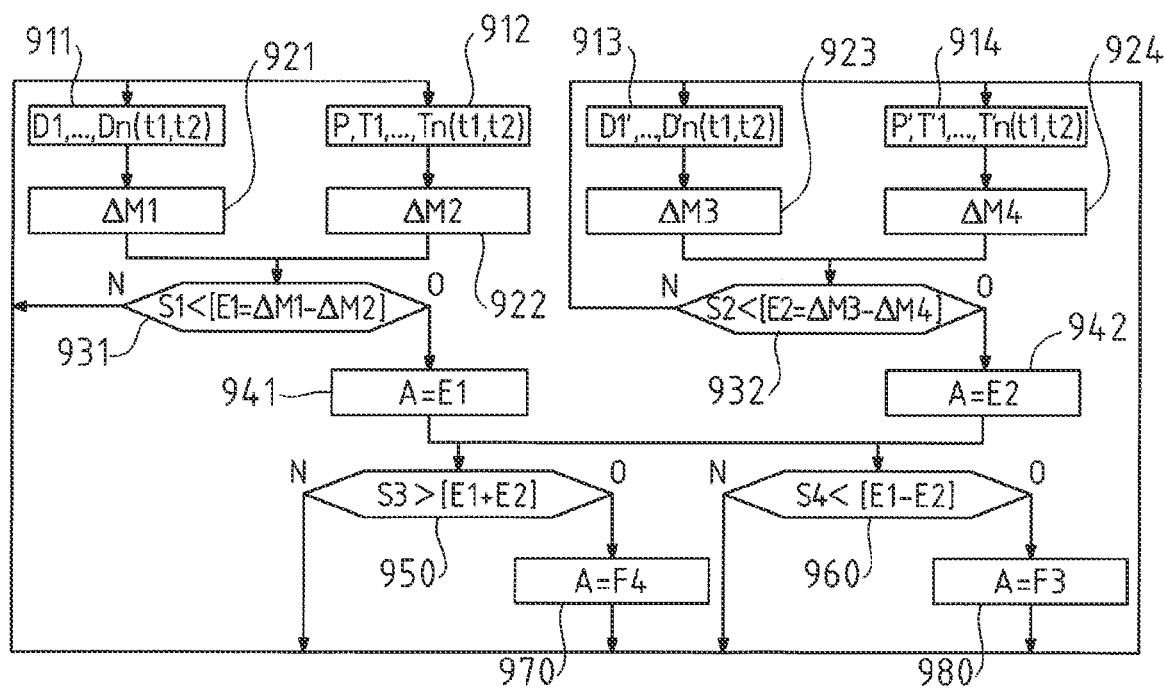
FIG. 9 represents an operating flowchart of the device in FIG. 8.

FIG. 9 illustrates an embodiment of the leak detection method implemented by the leak detection device 80. The method according to FIG. 9 comprises two independent loops specific to each insulation space 16 and 17.

The first loop performs two data acquisition steps 911 and 912 which are designed to retrieve all the data making it possible to determine a variation of mass of inert gas in the primary insulation space 16 according to the two calculation modes previously described. A first data acquisition step consists of retrieving the measurements of flow of gas injected and extracted between the moments t1 and t2 by the injection 21 and extraction 23 ducts. Depending on the measurement program implemented, a step 911 of this type can be carried out either by triggering a flow measurement start at the moment t1 and indicating the end of the measurement at the moment t2, or by reading and incorporating all the flow measurements carried out between the moment t1 and the moment t2 which correspond to the injection and extraction of gas between these two moments.

A second data acquisition step 912 consists of retrieving the pressure and temperature measurements specific to the primary insulation space for the moments t1 and t2. Depending on the measurement program implemented, a step 912 of this type can be carried out either by triggering a pressure measurement and temperature measurements at the moment t1 (or over a period following the moment t1) and at the moment t2 (or over a period preceding the moment t1), or by reading the measurements made around the moments t1 and t2, and incorporating them into an appropriate measurement period.

Typically, the period of time which separates t1 and t2 must be long enough to be able to distinguish a leak, whilst being reasonably short in order to permit useful detection. For example, the duration which separates t1 and t2 is between one and a few hours.

A first calculation step 921 and a second calculation step 922 are carried out after the first and second data acquisition steps 911 and 912. The first calculation step 921 uses the measurements of flow of gas injected or extracted between the moments t1 and t2 by the injection 21 and extraction 23 ducts during the first data acquisition step 911, in order to determine a first variation of mass of inert gas $\Delta M1$. This first variation of mass of inert gas $\Delta M1$ is the resultant of the total masses of inert gas added by the injection duct 21, and removed by the extraction duct 23, between the first moment t1 and the second moment t2.

The second calculation step 922 uses the pressure and temperature measurements specific to the primary insulation space for the moments t1 and t2 retrieved during the second data acquisition step 912 in order to determine a second variation of mass of inert gas $\Delta M2$. This second variation of mass of inert gas $\Delta M2$ is obtained by the determination of a first mass of inert gas contained in the primary insulation space 16 at first moment t1, by the determination of a second mass of inert gas contained in the primary insulation space 16 at the second moment t2 using one of the calculation methods previously described, then calculating the difference between the second mass of gas and the first mass of gas, i.e.

$$\Delta M2 = \text{mass}(t2) - \text{mass}(t1). \qquad \text{[Math 3]}$$

A first comparison step 931 is used to calculate a first difference E1 between the first variation of mass of inert gas $\Delta M1$ and the second variation of mass of inert gas $\Delta M2$ and to compare this first difference E1 with a first threshold S1. Typically, the first difference E1 is a simple difference between the first and second variations of mass of inert gas $\Delta M1$ and $\Delta M2$. The first difference E1 is representative of a difference between two measurement modes of the same variation. If the primary insulation space is intact, in other words if there is no leak, this first difference should be substantially zero. However, measurement and calculation errors can show a slight difference. Also, the first threshold S1 is determined to correspond to a maximal error which depends on the measurement chain. The comparison of the first difference E1 with the first threshold S1 is carried out as an absolute value. If the first difference E1 is greater than the first threshold S1, that means that a leak is possible and the first alarm step 941 is carried out. On the other hand, if the first difference E1 is not greater than the first threshold S1, that means that there is apparently no leak, and the first difference E1 is stored for the remainder of the process. The first loop ends, in order to recommence by redundancy measurement, at third and fourth moments t3 and t4 corresponding to moments t1 and t2 incremented by a confirmation period.

The first alarm step 941 acts as a warning that the first difference E1 is too great, and thus a visual or audible alarm can be triggered intermittently to draw attention to this difference measurement. However, even if the first difference E1 is too great, there are cases where this difference can be caused by certain measurement conditions rather than by a leak. This is the case in particular during a transitory phase with a temperature which can change locally, rapidly and significantly, whereas the measurement and calculation conditions take into consideration a temperature equilibrium in the materials. It should therefore not be concluded immediately that there is a leak, but an alarm A is stored with the first difference E1 and the moments t1 and t2, for the purpose of subsequent re-use. Other verifications will make it possible to characterize a leak, in particular the test steps 950 and 960 which are carried out subsequently. According to a variant, it is verified in the memory whether an alarm A has already been stored once or several times with a first difference E1 which is too great, before triggering a visual or audible alarm.

The second loop is identical to the first loop, but it is carried out for the secondary insulation space. A third step 913 of acquisition of data is similar to the first step 911 of acquisition of data, but for the measurements of flow of gas injected or extracted by the injection 22 and extraction 24 ducts between the moments t1 and t2. A fourth step 914 of acquisition of data is similar to the second step 912 of acquisition of data, but for the pressure and temperature measurements specific to the secondary insulation space at the moments t1 and t2. A third step 923 of calculation is similar to the first step 921 of calculation, and it calculates a third variation of mass of inert gas $\Delta M3$ which is the resultant of the total masses of inert gas added by the injection duct 22 and removed by the extraction duct 24 between the first moment t1 and the second moment t2. A fourth step 924 of calculation is similar to the first step 922 of calculation, but to calculate a fourth variation of mass of inert gas $\Delta M4$ which is obtained by the determination of a third mass of inert gas contained in the secondary insulation space 17 at the first moment t1, by the determination of a fourth mass of inert gas contained in the secondary insulation space 17 at the second moment t2, then by calculation of the difference between the fourth mass of gas and the third mass of gas, i.e.

$$\Delta M4 = \text{mass}(t2) - \text{mass}(t1). \quad \text{[Math 4]}$$

A second step 932 of comparison is similar to the first step 931 of comparison, but to calculate a second difference E2 between the third variation of mass of inert gas $\Delta M3$ and the fourth variation of mass of inert gas $\Delta M4$, and to compare this second difference E2 with a second threshold S2. Typically, the second difference E2 is the difference between the third and fourth variations of mass of inert gas $\Delta M3$ and $\Delta M4$. The second difference E2 is representative of a difference between two measurement modes of the same variation, and is representative of the intactness of the secondary insulation space 17. The second threshold S2 is determined to correspond to a maximal measurement error. The comparison of the second difference E2 with the second threshold S2 takes place as an absolute value. If the second difference E2 is greater than the second threshold S2, that means that a leak is possible, and the second alarm step 942 is carried out. If the second difference E2 is not greater than the second threshold S2, that means that there is apparently no leak, and the second difference E2 is stored for the continuation of the process. The second loop ends in order to recommence at third and fourth moments t3 and t4 corresponding to moments t1 and t2 incremented by the confirmation time.

The second alarm step 942 is similar to the first alarm step 941, but in relation with the second difference E2. An alarm A is stored with the second difference E2 and the moments t1 and t2 for the purpose of subsequent re-use. The test steps 950 and 960 are then carried out. According to a variant, there is verification in the memory of whether an alarm A has already been stored once or several times with a second difference E2 which is too great, before triggering a visual or audible alarm.

A test step 950 is a step of verification of a possible detection of a leak because the first difference E1 or the second difference E2, or the first and second differences E1 and E2 are too great. During this step, there is comparison of the first difference E1 with the second difference E2 in order to verify whether the variation of these differences E1 and E2 is compensated for. In other words, if a difference E1 or E2 shows a loss of gas in one of the insulation spaces 16 or 17, and the other differences E2 or E1 shows an increase of gas in the other one of the insulation spaces 17 or 16, then it is probable that a leak exists between the two spaces, and that this leak is located in the secondary sealing membrane 14. In order to carry out the test, the algebraic sum of the first and second differences E1 and E2 is carried out. In the event of a leak in the secondary membrane, the first difference E1 should be the opposite of the second difference E2, and thus their sum should be zero. A comparison of the sum as an absolute value with a third threshold S3 is carried out. If the sum is greater than the threshold S3, then it is considered that the test was not relevant, and it is possible to wait for at least a confirmation time in order to recommence the process at the moments t3 and t4. If, on the contrary, the sum is lower than the third threshold S3, then an alarm step 970 must be carried out.

The alarm step 970 stores an alarm A with the mention F4 for the purpose of a further verification. The mention F4 comprises the identification of a probable leak in the secondary sealing membrane, as well as the moments t1 and t2. In addition, a visual or audible alarm can be triggered in order to warn the crew of a leak in the secondary sealing membrane. The visual or audible alarm can be triggered only if there is a second alarm recorded with the mention F4. At the end of this alarm step 970, there is a wait for at least a confirmation time in order to recommence the process at the moments t3 and t4.

A test step 960 is a step of verification of a possible detection of a leak because the first difference E1 or the second difference E2 or the first and second differences E1 and E2 are too great. During this step, there is comparison of the first difference E1 with the second difference E2, in order to verify whether these differences E1 and E2 are substantially equal or not. If these differences E1 and E2 are substantially equal, either there are two identical leaks in two distinct walls, which is unlikely, or there is a measurement situation which is creating a systematic error. This corresponds for example to a transitory phase for which the measurements are clearly more erroneous than they should be. If on the other hand the first and second differences E1 and E2 are not equal, this reinforces the probability of detection of a leak. An algebraic difference between the first and second differences E1 and E2 is calculated. Then, this difference is compared as an absolute value with a fourth threshold S4. If the difference is not greater than the fourth threshold S4, the first and second differences E1 and E2 are substantially equal, and the best thing is to wait for at least a confirmation time in order to recommence the process at the moments t3 and t4. If on the other hand the difference is greater than the fourth threshold S4, then an alarm step 980 should be carried out.

The alarm step 980 stores an alarm A with the mention F3 for the purpose of a subsequent verification. The mention F3 comprises identification of a difference E1 and E2 greater than the fourth threshold, as well as the moments t1 and t2. In addition, a visual or audible alarm can be triggered in order to warn the crew of a potential leak. The visual or audible alarm can be triggered only if there is a second alarm recorded with the mention F3. At the end of this third alarm step 980, there is a wait for at least a confirmation time in order to recommence the process at the moments t3 and t4.

In FIG. 9, the steps 911 to 914 of acquisition of data are carried out in parallel, and are followed by the calculation steps 921 to 924. However, these steps can be carried out sequentially in any order provided that the measurements carried out in the acquisition steps are carried out at the same moments t1 and t2, and the first calculation step 921 is carried out after the first acquisition step 911, the second calculation step 922 is carried out after the second acquisition step 912, the third calculation step 923 is carried out after the third acquisition step 913, and the fourth calculation step 924 is carried out after the fourth acquisition step 914.

Also, the steps 931 and 932 of comparison and the alarm steps 941 and 942 can be carried out more sequentially. The important thing is to calculate the first and second differences E1 and E2, to store an alarm A with the value of the first difference E1, if the first difference E1 is greater than the first threshold S1, and/or to store an alarm A with the value of the second threshold E2, if the second difference E2 is greater than the second threshold S2.

The test steps 950 and 960 and the alarm steps 970 and 980 can be carried out in parallel or sequentially. In certain cases, the test step 950 or 960 can be omitted.

Confirmation of a Leak

As previously indicated, the process makes it possible to detect a probability of a leak and to raise an alarm. As previously indicated, a cause of false detection can be associated with a transitory temperature state. By way of indication, during filling of a tank 2, the temperature of the primary sealing membrane 15 can vary by 80° C., and even by more than 160° C. if the tank had previously been drained. A temperature variation of this type is propagated through the primary insulation space 16 then through the secondary insulation space 17, in order to reach a thermal equilibrium situation corresponding to a linear distribution of temperature in each material. The particular feature of the insulation spaces 16 and 17 consists of being thermally insulating, which corresponds to a high level of thermal resistance, and thus to slow propagation of the variations of temperature. Thus, measurements carried out during or after a significant variation of temperature can be tainted by an error associated with the transitory state of temperature change. This error associated with the transitory state can be the source of false alarm.

A means for avoiding being affected by the transitory state consists of increasing considerably the number of temperature sensors, and reducing the determination of temperature by calculation. A major disadvantage is that, in order to avoid being affected by this transitory error completely, the number of sensors must be so large that the cost of the equipment would be unacceptable. Consequently, this type of error must be remedied differently.

The variation of temperature which is associated with the filling of a tank is relatively great. A first possibility is to wait throughout a stabilization time, for example two days, after filling the tank, before taking the alarms into consideration.

In addition, apart from filling of the tank, there may be conditions which give rise to substantial temperature variations, such as the partial transfer of liquid gas between two tanks of the ship, or also a variation of exterior temperature of several tens of degrees in a few hours. Conditions of this type can falsify the measurements for periods of several hours.

Therefore it is preferable to confirm the alarms automatically by redundant repetition of the method after a period of confirmation time has elapsed. The process is thus repeated at moments t3 and t4 corresponding to the moments t1 and t2 incremented by the confirmation time. The confirmation time can be equal to, or greater than, the period which separates t1 and t2. In addition, each time an alarm A is recorded, the alarm conditions and the moments corresponding to the alarm moments are recorded. Thus, the leak detection device can by itself check whether an alarm has been repeated, and trigger a visual or audible alarm only if there is repetition of said alarm. The number of times that an alarm is repeated before triggering a visual or audible alarm can be configured in the system, for example according to the type of alarm. The alarms which are simply associated with an excessive difference E1 or E2 may require more repetitions than the alarms F3 or F4, for which a second criterion is taken into account.

It will be appreciated that, in the event of triggering of a visual or audible alarm, there must be human confirmation of the alarm. In particular, it is possible to change certain parameters in order to confirm or invalidate the alarm. By way of indication, certain choices of times can in themselves be the cause of a false alarm if the confirmation time is for example a day, and the time between t1 and t2 corresponds to the peak sunshine time 9 h00-12 h00 at a latitude with strong heat; this will correspond to a measurement carried out in a transitory state. In order to confirm a leak, the crew can act on the time which separates t1 and t2, and on the confirmation time, in order to verify if the leak is confirmed with a change of measurement conditions.

In addition, analysis of the alarms recorded also makes it possible to invalidate a leak or to locate it. The insulation spaces 16 and 17 are in a state of slight excess pressure or low pressure relative to atmospheric pressure and relative to the pressure of the tank. In addition, if the pressure between the two insulation spaces is different, and if there is a leak, this leak is necessarily directed in a certain direction going from the highest pressure to the lowest pressure. The first and second differences E1 and E2 indicate if gas is escaping or if gas is arriving in the insulation space concerned, outside the injection and extraction ducts, which also corresponds to a direction of leak. If the determinations of direction relating to the first and second differences E1 and E2 are incompatible with the possible direction of the gases, the alarms are false alarms. On the other hand, if the determinations relating to the first and second differences E1 and E2 are in conformity with the possible direction of the gases, the alarms can be confirmed.

Thus, after multiple confirmations of the alarms, it becomes possible to determine a strong probability of a leak, as well as the wall in which the leak is located. In fact, if the alarm F3 and alarm F4 are confirmed in a multiple manner, the leak is on the secondary sealing membrane. If the alarm F3 is confirmed with the difference E1, and the alarm F4 is not confirmed, then the leak is in the primary sealing membrane. If the alarm F3 is confirmed with the difference E2, and the alarm F4 is not confirmed, then the leak is in the secondary sealing membrane.

In addition, gas transport ships can have detectors of the gas type in the tank and in each insulation space, in order to detect the presence of a gas which should not be there. The detection of oxygen or the presence of water in the secondary space indicates a leak in the inner wall of the hull. The detection of a hydrocarbon of the type such as methane, ethane, butane or propane in the primary space or detection of nitrogen in the liquid gas tank indicates a leak from the primary sealing membrane. The use of these different detection means makes it possible to obtain redundancy of confirmation of leakage.

Other Variants

The invention has been described relative to a double-membrane tank carrying out a calculation of variation of mass of gas according to two different methods in order to obtain two differences E1 and E2 specific to each of the spaces. Although it is particularly advantageous to use a device of this type with a double-membrane tank, in particular in order to detect a leak at the secondary sealing membrane, it is possible to use a simplified system to detect leaks only in a single insulation space.

For a double-membrane tank, as previously indicated, detection of a leak by means of the presence of an extraneous gas can be carried out in the insulation spaces 16 and 17 and in the tank 2. The use of a measurement of variation in a single one of the insulation spaces can be sufficient if it is wished to detect only a leak in the secondary sealing membrane in combination with other means for detection of a leak, without adding redundancy of detection. Thus, a single difference E1 or E2 will be measured, and the test steps 950 and 960 and the alarm steps 970 and 980 not be carried out. In fact, multiple confirmation of the difference E1 or E2 makes it possible to determine a strong probability of a leak in the insulation space in which the measurement is being carried out. If the other means for detection of the leak do not indicate a leak, then the leak can only be in the secondary sealing membrane. The use of the double detection of variation of mass in a single space makes it possible to improve the detection of a leak in the secondary sealing membrane, which can be considered sufficient if it is not wished to have a redundant system.

According to another variant, the invention can be applied to a tank which has only a single insulation space, such as, for example, a liquid petroleum gas (LPG) tank. In this case, a single difference can be calculated. A system of this type can be used alone or in redundancy with another leak detection device.

The description refers to a transport ship with a plurality of tanks. The leak detection device 80 can be multiplied by the number of tanks, or, if required, a single leak detection device can be used with a plurality of tanks provided with the sensors necessary to implement the method on each tank. In this last case, the leak detection device will implement the leak detection algorithm as many times as there are tanks.

In addition, the invention is not limited to transport ships. In fact, it applies to any type of liquid gas storage installation comprising one or a plurality of tanks. The installation tanks can be tanks which have one or two insulation spaces. The leak detection device can be placed remotely in a location for monitoring of the tanks which is not necessarily the control room of a ship.

Although the invention has been described in association with a plurality of particular embodiments, it will be appreciated that it is in no way limited to these, and that it comprises all the technical equivalents of the means described, as well as their combinations, if these come within the scope of the invention.

The use of the verbs "contain", "comprise" or "include" and their conjugated forms does not exclude the presence of elements or steps other than those described in a claim. The use of the indefinite article "a" or "an" for an element or a step does not exclude the presence of a plurality of such elements or steps, unless otherwise stated.

In the claims, any references in brackets cannot be interpreted as a limitation of the claim.

The invention claimed is:

1. A detection method for detecting a leak from a sealed, thermally insulating tank for liquid gas, said tank comprising a sealing membrane surrounding the liquid gas, the sealing membrane being surrounded by an insulation space which separates the sealing membrane from a sealed support wall, the insulation space being filled with solid, thermally insulating materials and an inert gas, the insulation space having at least one injection duct arranged to inject the inert gas and at least one extraction duct arranged to extract the inert gas, the detection method comprising the following steps:
    injecting inert gas into the insulation space;
    removing inert gas from the insulation space;
    determining a first variation of mass of inert gas between a first moment and a second moment, the first variation corresponding to the resultant of the total masses of inert gas added by the injection duct and removed by the extraction duct, between the first moment and the second moment;
    determining a first mass of inert gas in the insulation space at the first moment and second mass of inert gas in the insulation space at the second moment by means for measuring the pressure and temperature in a free volume of the insulation space;
    calculating a second variation of mass of inert gas between the first moment and the second moment, corresponding to the difference between the second mass and the first mass of inert gas; and
    comparing the first variation of mass of inert gas with the second variation of mass of inert gas, and triggering an alarm if a difference between the first variation and the second variation of mass of inert gas is greater than a first threshold.

2. The detection method as claimed in claim 1, wherein the sealing membrane is a secondary sealing membrane, wherein the insulation space is a secondary insulation space, and wherein the tank comprises a primary sealing membrane which is situated between the secondary sealing membrane and the liquid gas, the secondary sealing membrane and the primary sealing membrane being separated by a primary insulation space filled with solid, thermally insulating materials and inert gas.

3. The detection method as claimed in claim 2, wherein the measurements of the temperature comprise measurements carried out by temperature sensors placed in a plurality of locations on the support wall and on the secondary sealing membrane.

4. The detection method as claimed in claim 1, wherein the sealing membrane is a primary sealing membrane, wherein the insulation space is a primary insulation space, and wherein the tank comprises a secondary sealing membrane which is situated between the primary sealing membrane and the support wall, the primary sealing membrane and the secondary sealing membrane being separated by the primary insulation space, the secondary sealing membrane and the exterior wall being separated by a secondary insulation space filled with solid, thermally insulating materials and inert gas.

5. The detection method as claimed in claim 4, the secondary insulation space having at least one injection duct arranged to inject the inert gas and at least one extraction duct arranged to extract the inert gas, and wherein the detection method also comprises the following steps: determining a third variation of mass of inert gas in the secondary insulation space between the first moment and the second moment, the third variation corresponding to the resultant of the total masses of inert gas added by the injection duct and removed by the extraction duct between the first moment and the second moment; determining a third mass of inert gas in the secondary insulation space at the first moment, and a fourth mass of inert gas in the secondary insulation space at the second moment by means for measuring the pressure and temperature in a free volume of the secondary insulation space; calculating a fourth variation of mass of inert gas in the secondary insulation space between the first moment and the second moment corresponding to the difference between the fourth mass and the third mass of inert gas; and comparing the third variation of mass of inert gas with the fourth variation of mass of inert gas, and triggering an alarm if a difference between the third variation and the fourth variation of mass of inert gas is greater than a second threshold.

6. The detection method as claimed in claim 5, wherein the detection method further comprises a step of determining the presence of a leak in the secondary sealing membrane if the difference between the first variation and the second variation of mass of inert gas is greater than the first threshold or if the difference between the third variation and the fourth variation of mass of inert gas is greater than the second threshold, and if the algebraic sum of the difference between the first variation and the second variation of mass of inert gas and the difference between the third variation and the fourth variation of mass of inert gas is lower than a third threshold.

7. The detection method as claimed in claim 5, wherein the detection method further comprises a step of determining the presence of a leak in at least one of the primary and secondary insulation spaces if the difference between the first variation and the second variation of mass of inert gas is greater than the first threshold or if the difference between the third variation and the fourth variation of mass of inert gas is greater than the second threshold, and if a difference between the difference between the first variation and the second variation of mass of inert gas and the difference between the third variation and the fourth variation of mass of inert gas is greater than a fourth threshold.

8. The detection method as claimed in claim 1, wherein there is reiteration of the steps of determining a first variation of mass of inert gas between a first moment and a second moment, determining a first mass of inert gas in the insulation space at the first moment and second mass of inert gas in the insulation space at the second moment, calculating a second variation of mass of inert gas between the first moment and the second moment, and comparing the first variation of mass of inert gas with the second variation of mass of inert gas and triggering an alarm between a third moment, corresponding to the first moment incremented by a confirmation time, and fourth moment corresponding to the second moment incremented by the confirmation time, and wherein the presence of a leak is determined if said alarm is triggered again after the confirmation time has elapsed.

9. The detection method as claimed in claim 1, wherein the steps of determining a first variation of mass of inert gas between a first moment and a second moment, determining a first mass of inert gas in the insulation space at the first moment and second mass of inert gas in the insulation space at the second moment, calculating a second variation of mass of inert gas between the first moment and the second moment, and comparing the first variation of mass of inert gas with the second variation of mass of inert gas and triggering an alarm are carried out after a time longer than a predetermined stabilization time after filling of the tank.

10. The detection method as claimed in claim 1, wherein the measurements of the pressure and temperature are carried out for a first measurement time including the first moment or starting after the first moment, with the first mass being a mean mass for the first measurement time, and for a second measurement time including the second moment or ending before the second moment, with the second mass being a mean mass for the second measurement time.

11. The detection method as claimed in claim 10, wherein no inert gas is added to, or extracted from, the insulation space during the first measurement time and the second measurement time.

12. The detection method as claimed in claim 10, wherein the first measurement time and the second measurement time are shorter than the time which separates the first moment and the second moment.

13. The detection method as claimed in claim 1, wherein the measurements of the temperature comprise estimates which are calculated on the basis of the temperature of the liquid gas and the level of liquid gas in the tank.

14. The method as claimed in claim 1, wherein the first variation of mass of inert gas is measured according to a mass flow of inert gas at an injection valve of the injection duct and an extraction valve of the extraction duct, and wherein the mass flow at the injection valve or the extraction valve is determined according to a degree of opening of said injection or extraction valve, respectively.

15. The detection method as claimed in claim 1, wherein the first variation of mass of inert gas is measured according to a mass flow of inert gas at an injection valve of the injection duct and an extraction valve of the extraction duct, and wherein the mass flow of gas at the injection valve or the extraction valve is determined according to the pressure and the temperature of the inert gas upstream and downstream from said injection or extraction valve, respectively.

16. The detection method as claimed in claim 1, wherein the first variation of mass of inert gas is measured according to a mass flow of inert gas at an injection valve of the injection duct and an extraction valve of the extraction duct, and wherein the mass flow at the injection valve or the extraction valve is measured by a flowmeter measuring the mass of gas at the injection valve or at the extraction valve, respectively.

17. The detection method as claimed in claim 1, wherein the measurements of the pressure and the temperature in order to determine the first or second mass of inert gas in the insulation space are carried out in a plurality of areas of the insulation space, wherein said areas together form the free volume of the insulation space.

18. An installation for storage of liquid gas comprising a sealed, thermally insulating tank which comprises a sealing membrane surrounding the liquid gas, the sealing membrane being surrounded by an insulation space which separates the sealing membrane from a sealed support wall, the insulation space being filled with solid, thermally insulating materials and an inert gas, the insulation space having at least one injection duct arranged to inject the inert gas and at least one extraction duct arranged to extract the inert gas,
- wherein the tank comprises at least one pressure sensor and a plurality of temperature sensors which are configured to determine the pressure and the temperature of the inert gas enclosed in a free volume of the insulation space,
- wherein the installation comprises flow measurement devices to measure a flow of inert gas in the injection duct and in the extraction duct, and at least one leak detection device, the at least one leak detection device being configured to:
  - determine together with the flow measurement devices a first variation of mass of inert gas between a first moment and a second moment, with the first variation corresponding to the resultant of the total masses of inert gas added by the injection duct and removed by the extraction duct between the first moment and the second moment;
  - determine a first mass of the inert gas in the insulation space at the first moment and a second mass of inert gas in the insulation space at the second moment based on pressure and temperature measurements carried out by the at least one pressure sensor and the plurality of temperature sensors in a free volume of the insulation space;
  - calculate a second variation of mass of inert gas between the first moment and the second moment corresponding to the difference between the second mass and the first mass of inert gas; and
  - compare the first variation of mass of inert gas with the second variation of mass of inert gas, and
  - trigger an alarm if a difference between the first variation and the second variation of mass of inert gas is greater than a first threshold.

19. The liquid gas storage installation as claimed in claim 18, wherein the sealing membrane is a secondary sealing membrane, wherein the insulation space is a secondary insulation space, and wherein the tank comprises a primary sealing membrane which is situated between the secondary sealing membrane and the liquid gas, the secondary sealing membrane and the primary sealing membrane being separated by a primary insulation space which is filled with solid, thermally insulating materials and an inert gas.

20. The liquid gas storage installation as claimed in claim 18, wherein the sealing membrane is a primary sealing membrane, wherein the insulation space is a primary insulation space, and wherein the tank comprises a secondary sealing membrane which is situated between the primary sealing membrane and the support wall, the primary sealing membrane and the secondary sealing membrane being separated by the primary insulation space, the secondary sealing membrane and the support wall being separated by a secondary insulation space which is filled with solid, thermally insulating materials and an inert gas.

21. The liquid gas storage installation as claimed in claim 20, wherein the secondary insulation space has at least one injection duct arranged to inject the inert gas and at least one extraction duct arranged to extract the inert gas, which tank comprises at least one pressure sensor, wherein at least some sensors among the plurality of temperature sensors are also configured to determine the temperature of the inert gas enclosed in the secondary insulation space, wherein the installation comprises flow measurement devices, in order to measure a flow of inert gas in the injection duct and in the extraction duct, and wherein the leak detection device is also configured to: determine a third variation of mass of inert gas in the secondary insulation space between the first moment and the second moment, the third variation corresponding to the resultant of the total masses of inert gas added by the injection duct and removed by the extraction duct between the first moment and the second moment determine a third mass of inert gas in the secondary insulation space at the first moment, and a fourth mass of inert gas in the secondary insulation space at the second moment based on measurements of the pressure and temperature in a free volume of the secondary insulation space; calculate a fourth variation of mass of inert gas in the secondary insulation space between the first moment and the second moment corresponding to the difference between the fourth mass and the third mass of inert gas; and compare the third variation of mass of inert gas with the fourth variation of mass of inert gas, and trigger an alarm if a difference between the third variation and the fourth variation of mass of inert gas is greater than a second threshold.

22. A liquid gas transport ship, characterized in that it comprises one or a plurality of liquid gas storage installations as claimed in claim 18.

* * * * *